Dec. 6, 1927.
K. R. NELSON
CRANK SHAFT
Filed Sept. 28, 1925
Fig. 1.
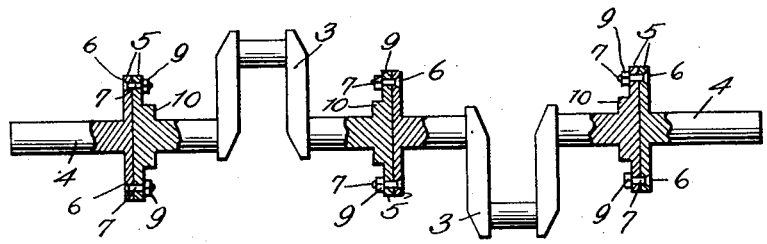
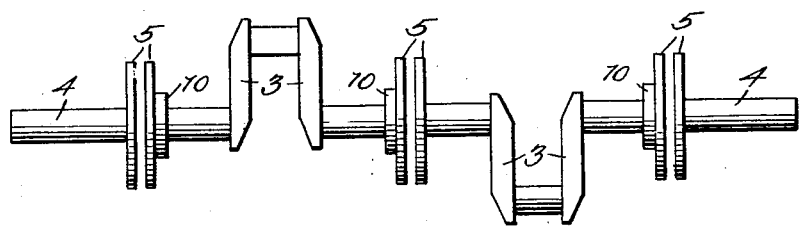
Fig. 2.
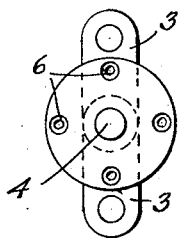
Fig. 3.
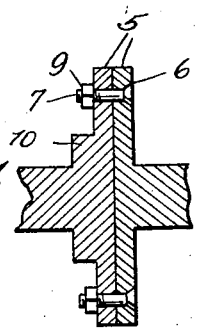
Fig. 4.
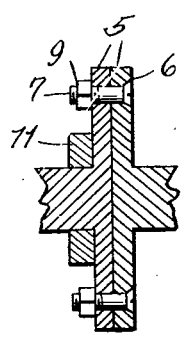
Fig. 5.
Inventor
Kenneth R. Nelson.
By S. W. Anderson
Attorney Patented Dec. 6, 1927.

1,651,465

UNITED STATES PATENT OFFICE.

KENNETH R. NELSON, OF OLNEY, ILLINOIS.

CRANK SHAFT.

Application filed September 28, 1925. Serial No. 59,099.

The invention has relation to power shafts and more particularly to the crankshafts of internal combustion engines, having for its object to provide an improved sectional shaft having a shear joint connection between the sections. Another object of the invention is to provide a shear joint connection of minimum dimensions longitudinally of the shaft. A further object is to provide a shaft so supported that the shearing of the connecting members will leave the sections supported in perfect alignment, whereby continued rotation of the shaft will not result in injury thereto; and a further object is to provide a sectional crankshaft having a maximum number of identical sections.

The invention consists in the novel construction and combinations of parts, as set forth in the appended claim.

In the accompanying drawings, illustrating the invention,

Figure 1 is a longitudinal sectional view taken through the axis of the crankshaft of an automobile, constructed according to my invention.

Figure 2 is a side view of the crankshaft, with the sections detached.

Figure 3 is an end view of the crankshaft.

Figure 4 is a detail sectional view taken through two adjacent flanges, showing the shear bolt connection and an integral collar.

Figure 5 is a similar view through a shear joint connection provided with a loose collar.

In these drawings the numerals 1, 1 represent the pistons of an internal combustion engine; 2, 2 the related connecting rods; 3 the crank sections and 4 the end sections of a sectional crankshaft, a separate crank section being provided for connection with each piston. The ends of each section 3 and the inner end of each section 4 are provided with thin disk-form flanges 5, cast integrally with the section and perforated at 6 for the reception of shear bolts 7, preferably of bronze or brass. Each crank section 3 of the shaft is supported in bearings 8, located between the flanges 5 and the crank arms, whereby in case of shearing of the bolts 7 any section may be rotated independently without damage to the shaft or bearings.

In order that the shear joints may occupy as little space as possible, longitudinally of the shaft, the shear bolts 7 preferably have their heads countersunk in the respective flanges 5, and the securing nuts 9 thereof partially countersunk in the adjacent flange. These nuts are thin, being intended merely to lock the bolts, and may be secured by a lace wire, as shown, although there is little tendency for the nuts to loosen, since the bolts preferably engage screw threads of the flange perforations at the nut ends thereof.

The nuts 9 are spaced from the bearings 8 by suitable collars, each section 3 being provided with such a collar, in the form of an integrally cast boss 10. Inasmuch as it may be desirable that all sections 3 should be identical and both sections 4 identical, one loose collar 11 may be provided, shown as mounted upon a crank section 3.

With a crankshaft constructed according to my invention, should backfiring occur or should any obstruction prevent the rotation of some part of the power transmission mechanism of which it forms a part, the bolts 7 would shear before the strain upon the shaft became excessive, and the necessary repairs would be slight, both as to expense and time involved, particularly in view of the accessibility of the parts to be replaced, since removal of the bottom pan of the crank case would permit access to these parts, whereas the replacement of a broken shaft would require the engine to be disassembled.

I claim:

A crankshaft comprising a plurality of identical crank sections having each two perforated flanges cast integral therewith and one such flange of each section having an integral collar, identical end sections having each a perforated flange cast integral therewith, a collar loosely mounted upon one of said shaft sections adjacent a flange thereof, and shear bolt connections between the flanges of adjacent sections, having countersunk heads and nuts lying in the planes of the collars.

In testimony whereof I affix my signature.

KENNETH R. NELSON.